United States Patent
Kuo

(10) Patent No.: US 7,564,592 B2
(45) Date of Patent: Jul. 21, 2009

(54) COLOR IMAGE EDGE ENHANCEMENT METHOD

(75) Inventor: Wen-Ning Kuo, Taipei (TW)

(73) Assignee: Primax Electronics Ltd., Taipei (TW)

( * ) Notice: Subject to any disclaimer, the term of this patent is extended or adjusted under 35 U.S.C. 154(b) by 588 days.

(21) Appl. No.: 11/312,543

(22) Filed: Dec. 21, 2005

(65) Prior Publication Data

US 2007/0139718 A1 Jun. 21, 2007

(51) Int. Cl.
*H04N 1/409* (2006.01)

(52) U.S. Cl. .................. 358/3.27; 358/3.06; 382/254

(58) Field of Classification Search ............. 382/209, 382/217, 218, 254, 264, 266, 269; 358/1.9, 358/3.06, 3.27, 3.23, 515, 532, 534
See application file for complete search history.

(56) References Cited

U.S. PATENT DOCUMENTS

| | | | |
|---|---|---|---|
| 5,029,108 A | | 7/1991 | Lung |
| 5,270,827 A | * | 12/1993 | Kobayashi et al. ......... 358/3.02 |
| 5,383,036 A | * | 1/1995 | Mailloux et al. ........... 358/518 |
| 5,404,411 A | * | 4/1995 | Banton et al. .............. 382/254 |
| 5,719,967 A | * | 2/1998 | Sekine ........................ 382/266 |
| 5,790,711 A | * | 8/1998 | Murakami ................... 382/267 |
| 5,815,605 A | * | 9/1998 | Koike .......................... 382/269 |
| 5,854,689 A | * | 12/1998 | Saito ........................... 382/264 |
| 6,181,438 B1 | * | 1/2001 | Bracco et al. ................ 358/1.9 |
| 6,333,998 B1 | * | 12/2001 | Matsumoto ................. 382/217 |
| 2007/0139716 A1 | * | 6/2007 | Chen ......................... 358/3.27 |

* cited by examiner

*Primary Examiner*—Thomas D Lee
(74) *Attorney, Agent, or Firm*—Harness, Dickey & Pierce, P.L.C.

(57) ABSTRACT

A color image edge enhancement method having the following steps: First, perform the halftone processing of a color image to produce a halftone image. Next, compare the dotting pattern of an edge pixel to be enhanced and the pixels in its perimeter in the halftone image with the contents of an edge enhancement table. Thus, search and obtain the dotting table and a corresponding dotting command having the most matching pattern. Then, divide the halftone image into the images of four color planes of cyan, magenta, yellow, and black colors respectively. Subsequently, compare the pattern of the edge pixel and the pixels in its perimeter in the respective color planes with the pattern in the dotting table to determine the color plane having the most matching pattern. Finally, execute the searched doting command to dot and enhance the edge pixel.

6 Claims, 23 Drawing Sheets
(8 of 23 Drawing Sheet(s) Filed in Color)

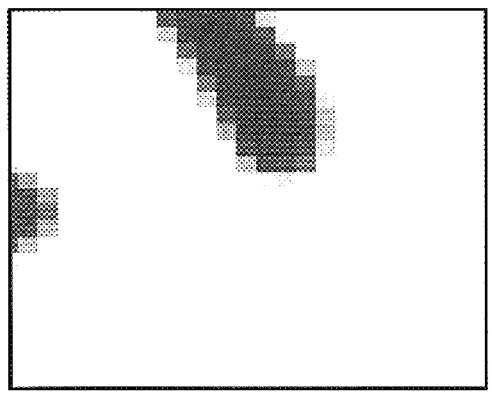
Cyan color plane     FIG. 3A
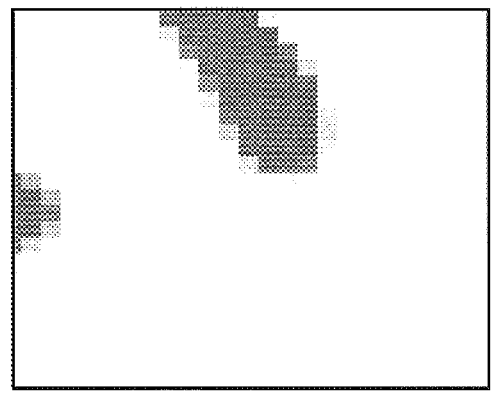
Magenta color plane     FIG. 3B

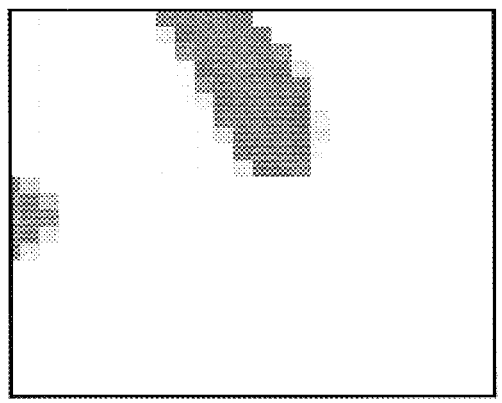
Yellow color plane    FIG.3C
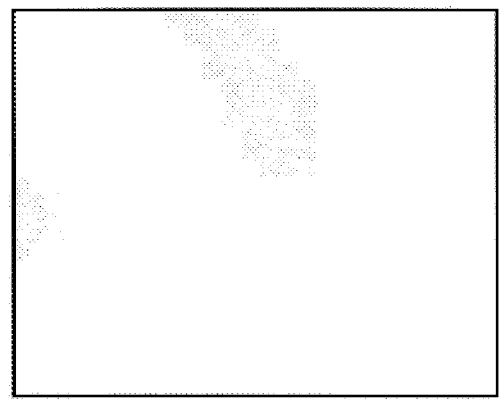
Black color plane    FIG.3D

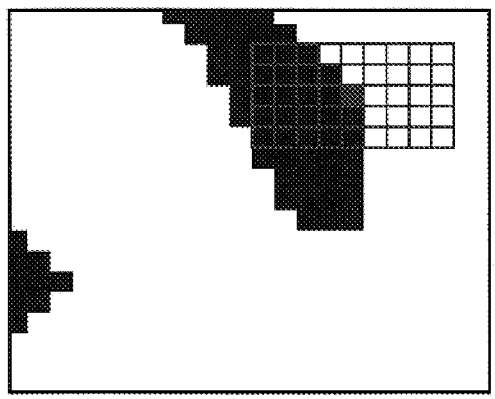
Cyan color plane   FIG.4A
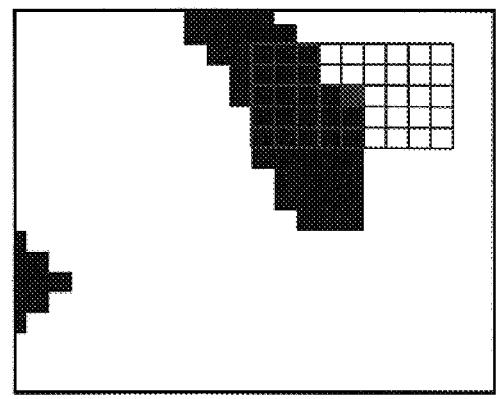
Magenta color plane   FIG.4B

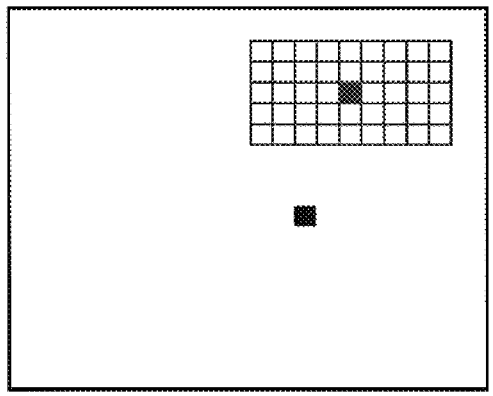
Yellow color plane    FIG.4C
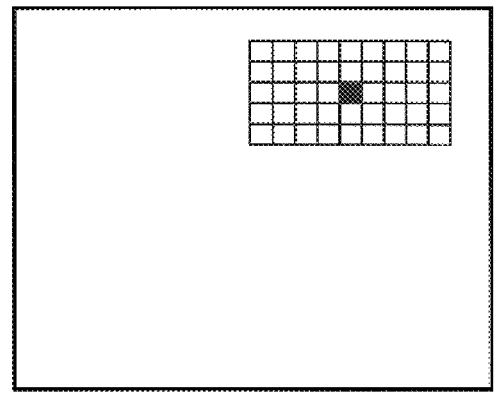
Black color plane    FIG.4D

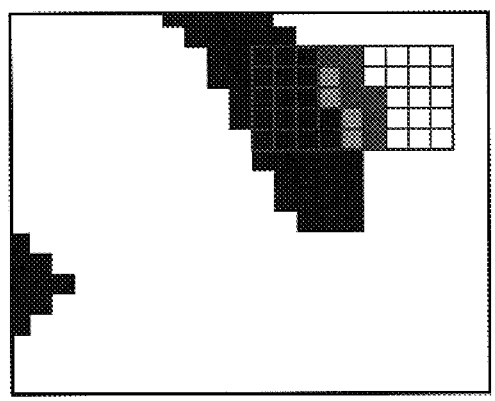
Cyan color plane  FIG. 7A
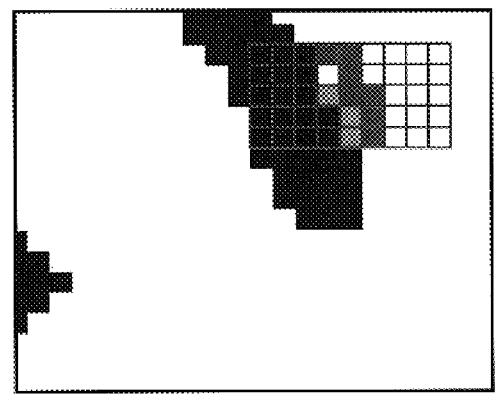
Magenta color plane  FIG. 7B

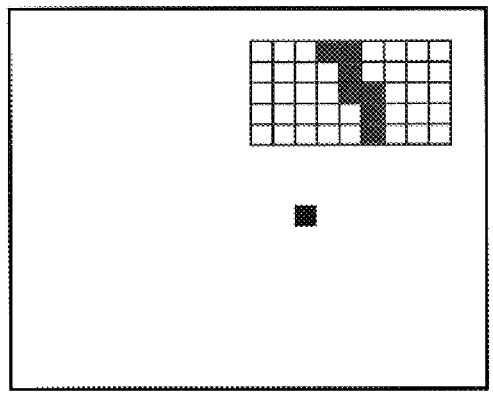
Yellow color plane    FIG.7C
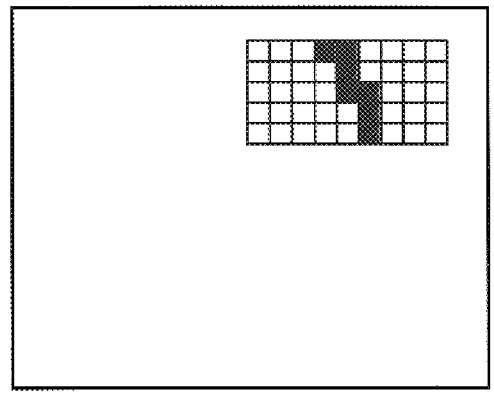
Black color plane    FIG.7D

COLOR IMAGE EDGE ENHANCEMENT METHOD

BACKGROUND

1. Field of the Invention

The invention relates to an image edge enhancement method applied to a grid matrix output device, and in particular to a color image edge enhancement method, which is used to determine how to proceed with the dotting of the edge pixels of the color images, so that the edges of the output images can be made smoother.

2. Related Art

Recently, in the field of image processing, the key point of most research and development is to improve the visual effect of an image output apparatus (e.g. a printer) such that the visual effect generated after image output matches with the real subject. The edge of the original image object, e.g., texts, curves, three-dimensional objects, etc., can be approximated by the linear equation or natural logarithm, etc., to be more smooth. When these objects are digitally processed, they are required to be converted into a matrix form which is processable for an image output apparatus, and their edges are required to match the grids of the apparatus.

However, if the resolution of the image output apparatus is relatively low, the edge of the image object is found to be step-shaped of one grid by another grid through the naked eye, and a smooth edge as that of the original image object cannot be obtained. Therefore, various solutions are proposed to reduce the jagged effect on the edge of the image object, such that the image output by the image output apparatus can match with the real subject.

As for Edge Enhancement Method and Apparatus for Dot Matrix Devices disclosed in U.S. Pat. No. 5,029,108, the dotting state of the pixels of an image edge and that of the surrounding pixels are compared with a plurality of predetermined pictures, to determine which predetermined picture the pixels of the image edge match with, thus it is determined how to dot the pixels at the image edge to smooth the output image edge and to allow the image more accurately match with the original one. The enhancement of central pixels of each predetermined picture will be modified differently according to the dotting state of the surrounded pixels, for example, dotting at ¼ to the left of the central pixel, dotting at ⅔ to the right of the central pixels, etc However, the method mentioned above is only suitable for single color image output (namely, the black and white image output). When executing the color image output of the image output device, since each of the color images are composed of the planes of four different colors (cyan, magenta, yellow, and black; CMYK), Thus, in executing the supplementary dotting of the pixels on the edge of the image, the planes of all the four colors must be taken into consideration. Presently it doesn't have any mechanism, which can be utilized to determine the planes, of which colors must be utilized to implement the supplementary dotting of the pixels on the edge of the image. However, if the planes of all the four colors are used to perform the supplementary dotting, then the color displayed on this pixel will be black, thus it may be different from that of the original subject. Nevertheless, there is just no way to know which color may be used to implement the supplementary dotting.

Therefore, to the color image output device, the determination of how to enhance the edge of the image, so that the edge of the output image is smoother and with its color matching that of the original subject, is the most important problem that must be solved in this field.

SUMMARY OF THE INVENTION

In view of the above-mentioned problems and shortcomings of the prior art, the object of the invention is to provide a color image edge enhancement method, which is applied to a grid matrix output device such as a printer or display. The color image edge enhancement method is used to determine which color planes are to be used and how to proceed with the dotting of the pixels on the edge of a color image, so that the color of the produced image matches that of the original subject, thus the edge of the image can be made smoother, without generating jagged edges.

Therefore, to achieve the above-mentioned object, the color image edge enhancement method of the invention includes the following steps:

Firstly, implement the halftone processing of a color image, thus producing a halftone image. Next, compare the dotting pattern of the edge pixel to be enhanced and the pixels in its perimeter in the halftone image with the contents of an edge enhancement table, to search and obtain the dotting table and its corresponding dotting command, having the most matching pattern. This edge enhancement table is calculated and produced according to the equation as disclosed in the above-mentioned prior art. There have seven groups in the edge enhancement tables, each group having its dotting tables corresponding dotting commands respectively. These dotting commands are utilized to determine how the central pixel of a color image is to be dotted according to the dotting pattern of the central pixel and the pixels in its perimeter in this dotting table (this central pixel corresponds to the edge pixel of the image to be dotted and enhanced).

Then, divide the halftone image into the images in four color planes of CMYK colors respectively. Subsequently, compare the dotting patterns of the edge pixel to be enhanced and the pixels in its perimeter with the contents of the above-mentioned dotting table, so as to determine the color planes, having the most matching patterns.

Finally, execute the enhanced dotting of the edge pixel with the dotting commands thus determined by making use of the color planes, having the most matching patterns. As such, the edge of the image produced can be smoother without generating jagged edges.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing will be provided by the Office upon request and payment of the necessary fee.

The invention will become more fully understood from the detailed description given below, which is for illustration only and thus is not limitative of the invention.

FIGS. 3A to 3D are four color planes corresponding CMYK colors by dividing the image of the edge pixel shown in FIG. 1;

FIGS. 4A to 4D show the halftone images of the four color planes obtained through halftone processing of the images of FIGS. 3A to 3D.

FIGS. 7A to 7D show the images of the four color planes of four respective CMYK colors obtained by dividing the overlapped halftone image in FIG. 5.

DETAILED DESCRIPTION OF THE INVENTION

The purpose, construction, features, and functions of the invention can be appreciated and understood more thoroughly through the following detailed description with reference to the attached drawings.

The invention provides a color image edge enhancement method, which is applied to a grid matrix output device such as a printer or display. The color image edge enhancement method is used to determine which color planes are to be used and how to proceed with the dotting of the pixels on the edge of a color image, so that the color of the produced image matches that of the original subject, thus the edge of the image can be made smoother, without generating jagged edges.

Figure 1:
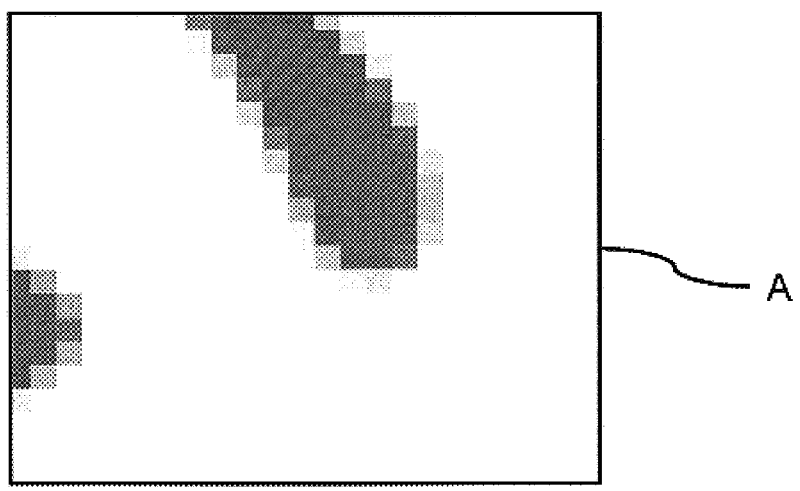
FIG. 1 shows a color image indicating an edge pixel A.
Figure 2:
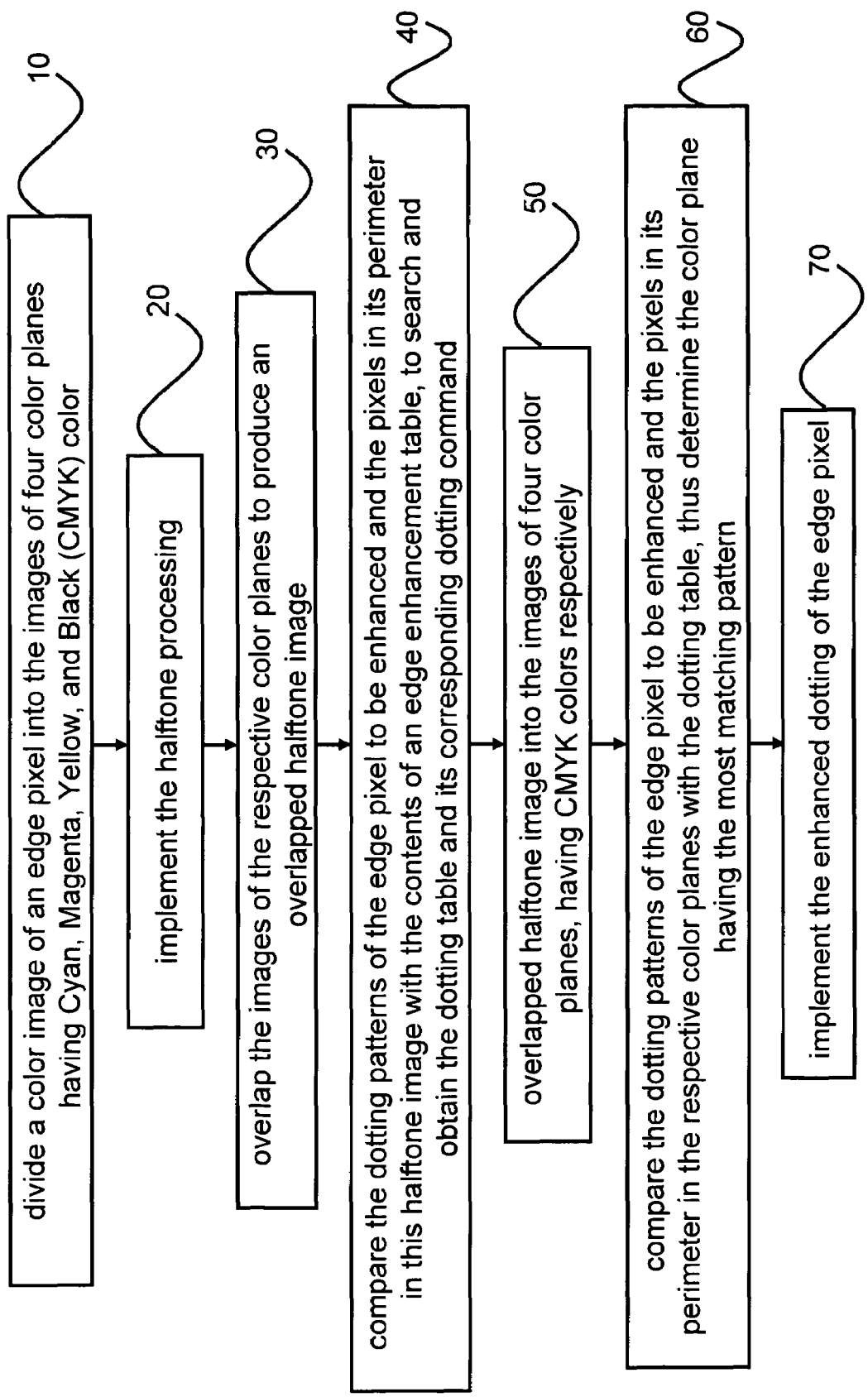
FIG. 2 is a system flowchart illustrating the various steps of the edge enhancement method for color images according to an embodiment of the invention.

Refer to FIG. 1 for a color image indicating an edge pixel A. The edge pixel A is utilized to illustrate a method of enhancing the edge pixel according to an embodiment of the invention. Next, refer to FIG. 2, for a system flowchart illustrating the various steps of the color image edge enhancement method according to an embodiment of the invention. The details of each of the steps are described as follows.

Firstly, divide a color image of an edge pixel A shown in FIG. 1 into the images of four color planes having four different colors: Cyan, Magenta, Yellow, and Black (CMYK) respectively (step 10). After division, the four color planes of the four different colors (CMYK) are shown in FIGS. 3A to 3D respectively.

Next, implement the halftone processing of the respective color planes (step 20), thus generate the halftoned images in four respective color planes having CYMK colors.

Figure 5:
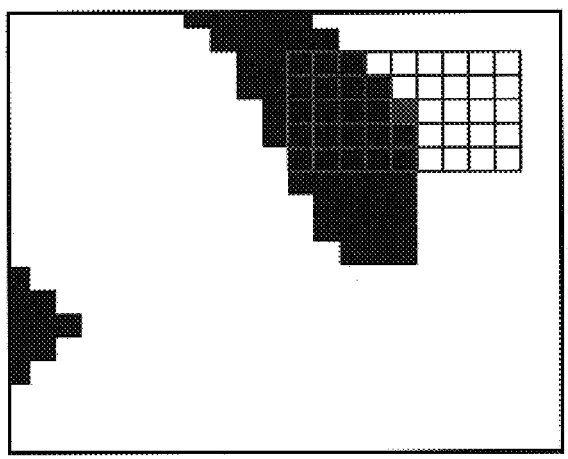
FIG. 5 is an overlapped halftone image after overlapping the halftone images of FIGS. 4A to 4D.

Then, overlap the images of the respective color planes to produce an overlapped halftone image (step 30). Namely, overlap the halftone images of the respective color planes as shown in FIGS. 4A to 4D into an overlapped halftone image as shown in FIG. 5.

Subsequently, compare the dotting patterns of the edge pixel to be enhanced and the pixels in its perimeter in this halftone image with the contents of an edge enhancement table, to search and obtain the dotting table and its corresponding dotting command, having the most matching patterns (step 40).

Then, refer to FIGS. 6A to 6I for the schematic diagram of the respective edge enhancement table. In the embodiment of the invention, there have seven groups in the edge enhancement tables, each group having its dotting tables 80 corresponding dotting commands 81 respectively. Each dotting table 80 constructed as a 9 by 5 grid table. These dotting commands 81 are utilized to determine how the central pixel A' of the image is to be dotted according to the dotting pattern of the central pixel A' and the pixels in its perimeter (this central pixel A' corresponds to the edge pixel A to be dotted in FIG. 1)

In the above descriptions, each group of dotting tables 80 has a same corresponding dotting command 81. In the edge enhancement table of this embodiment, each group is only consisted of 2 to 4 dotting tables 80. However, each of the respective dotting commands 81 may have more dotting tables 80, which can be utilized as a basis in dotting the central pixels A' of different patterns.

Figure 6A:
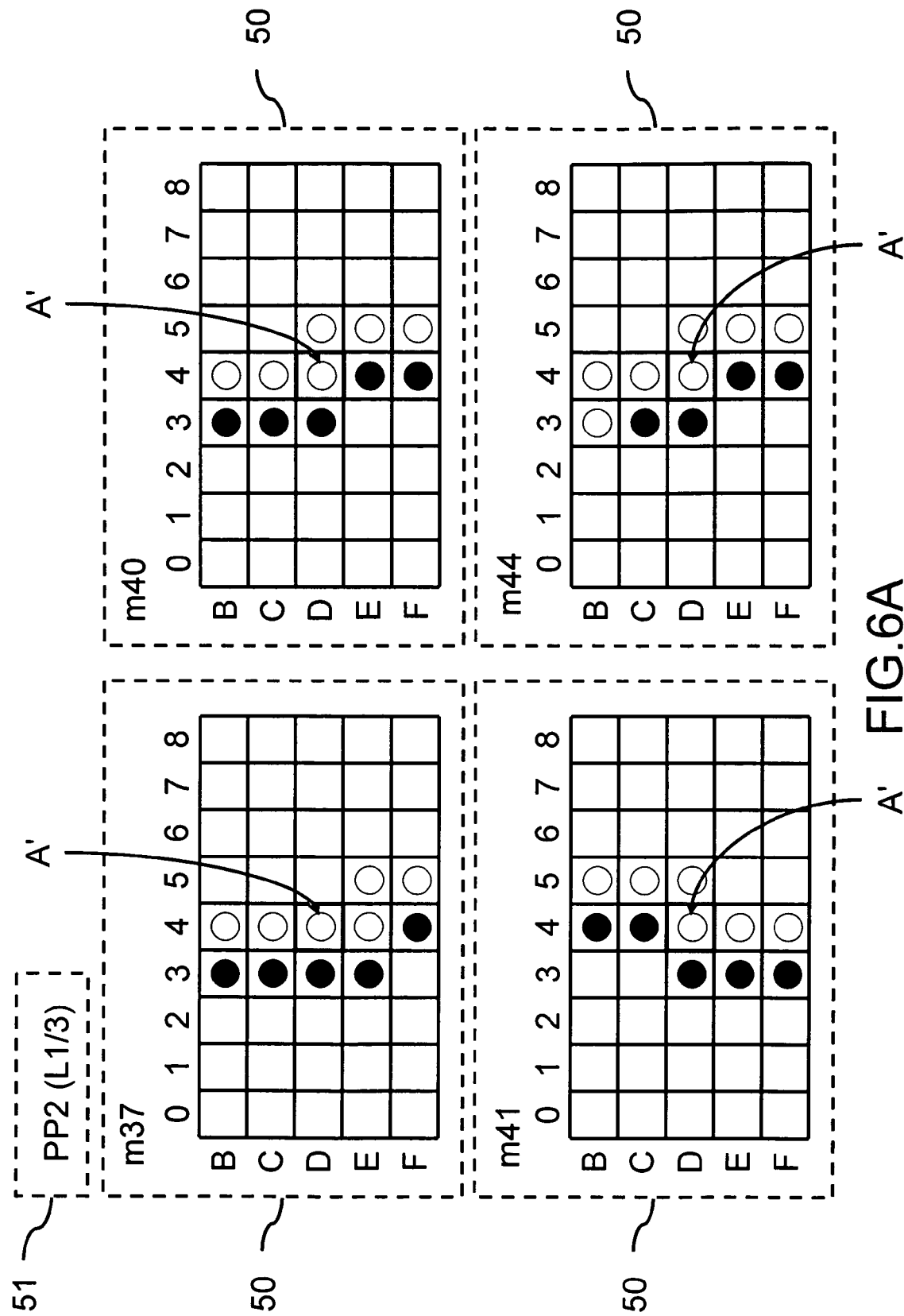
FIGS. 6A to 6I show the schematic diagrams of the respective edge enhancement table.
Figure 6B:
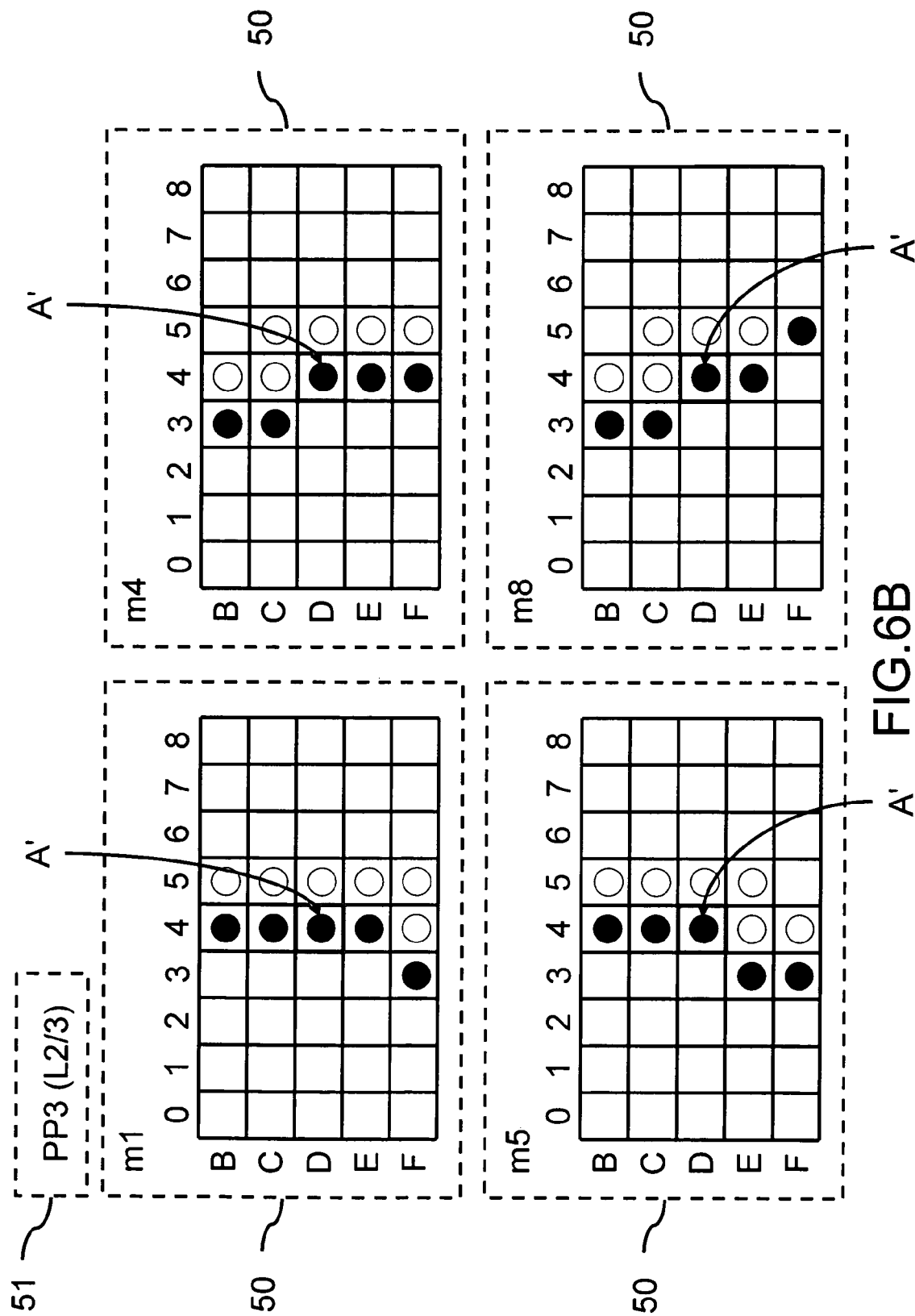
Figure 6C:
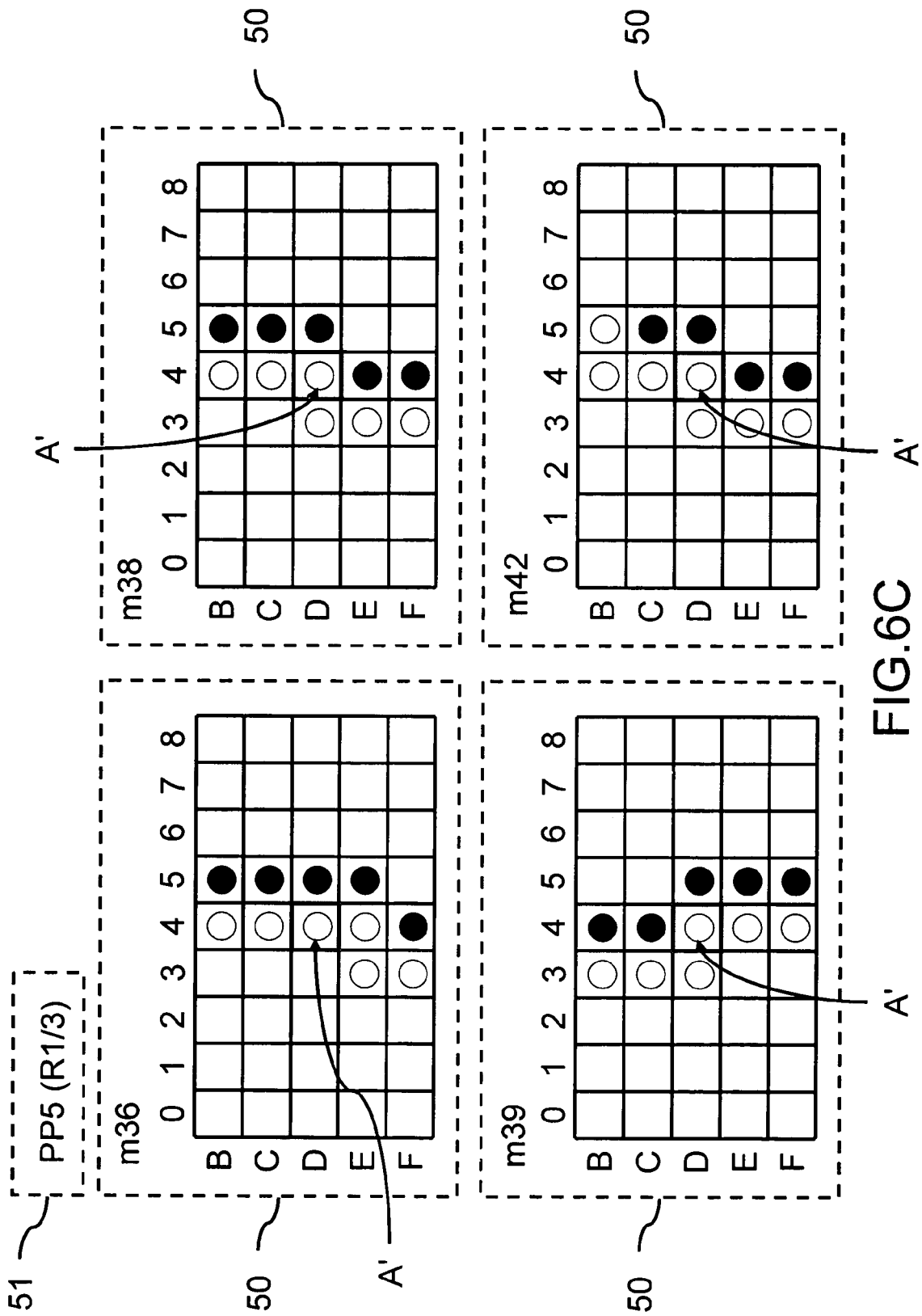
Figure 6D:
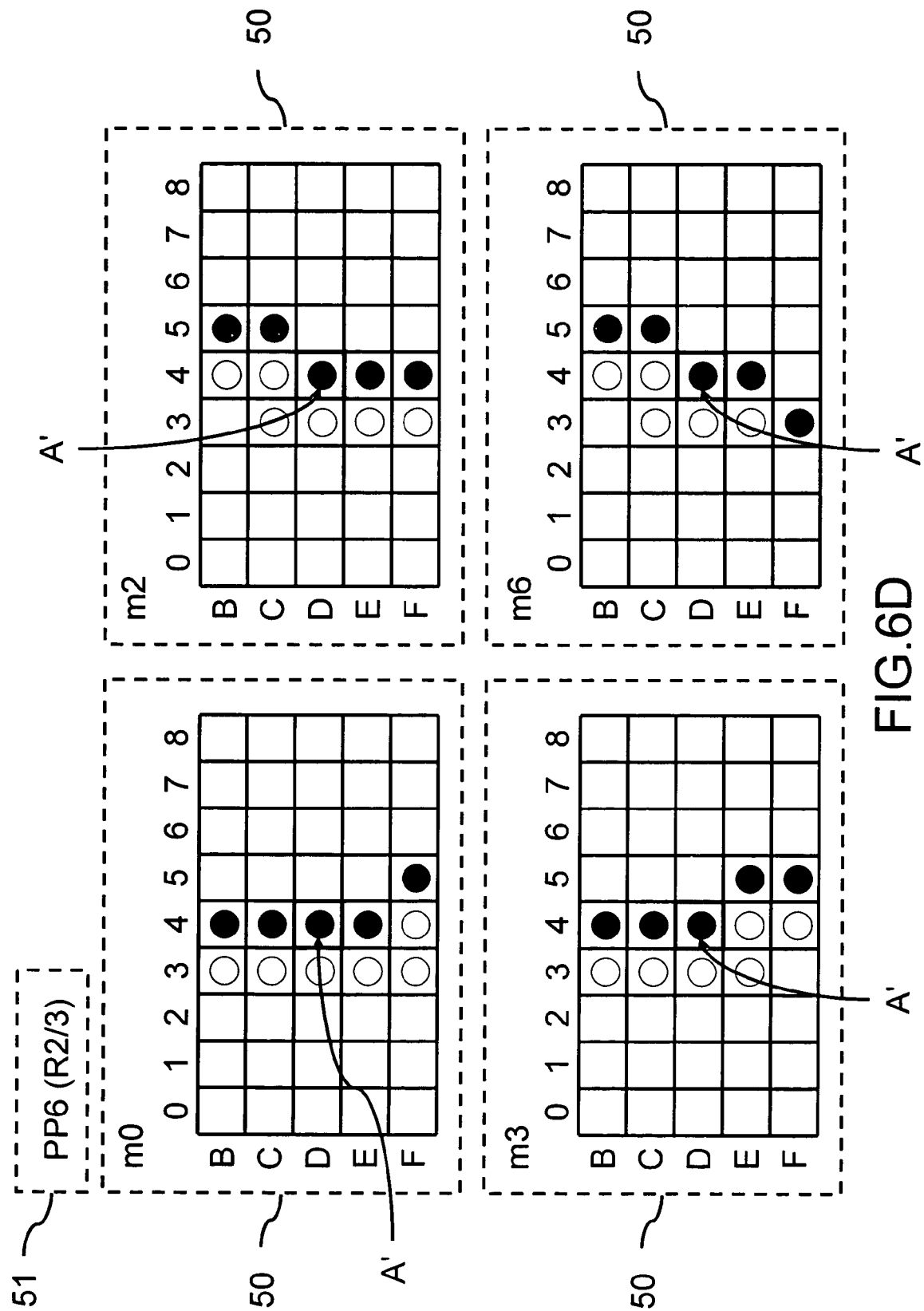
Figure 6E:
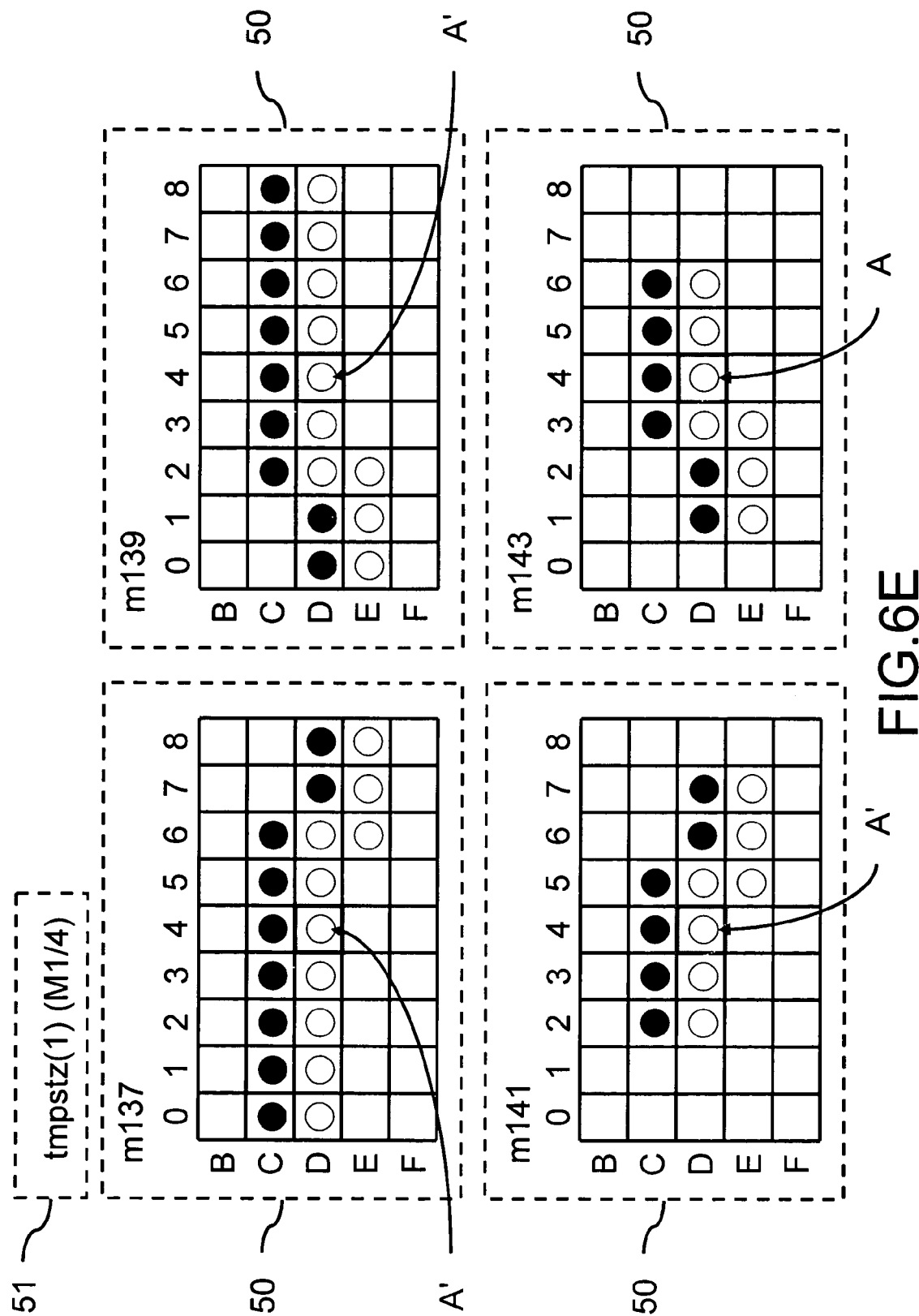
Figure 6F:
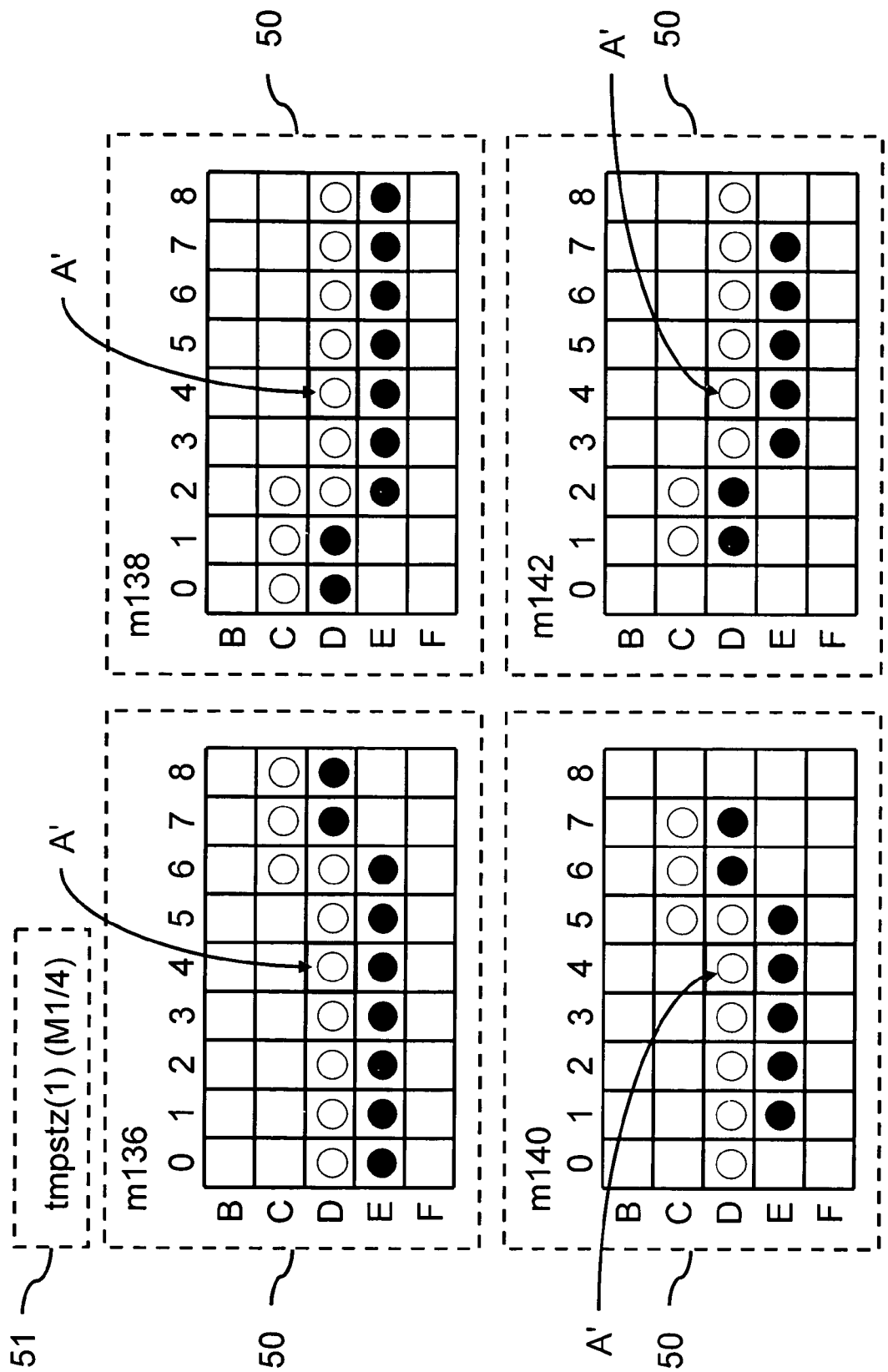
Figure 6G:
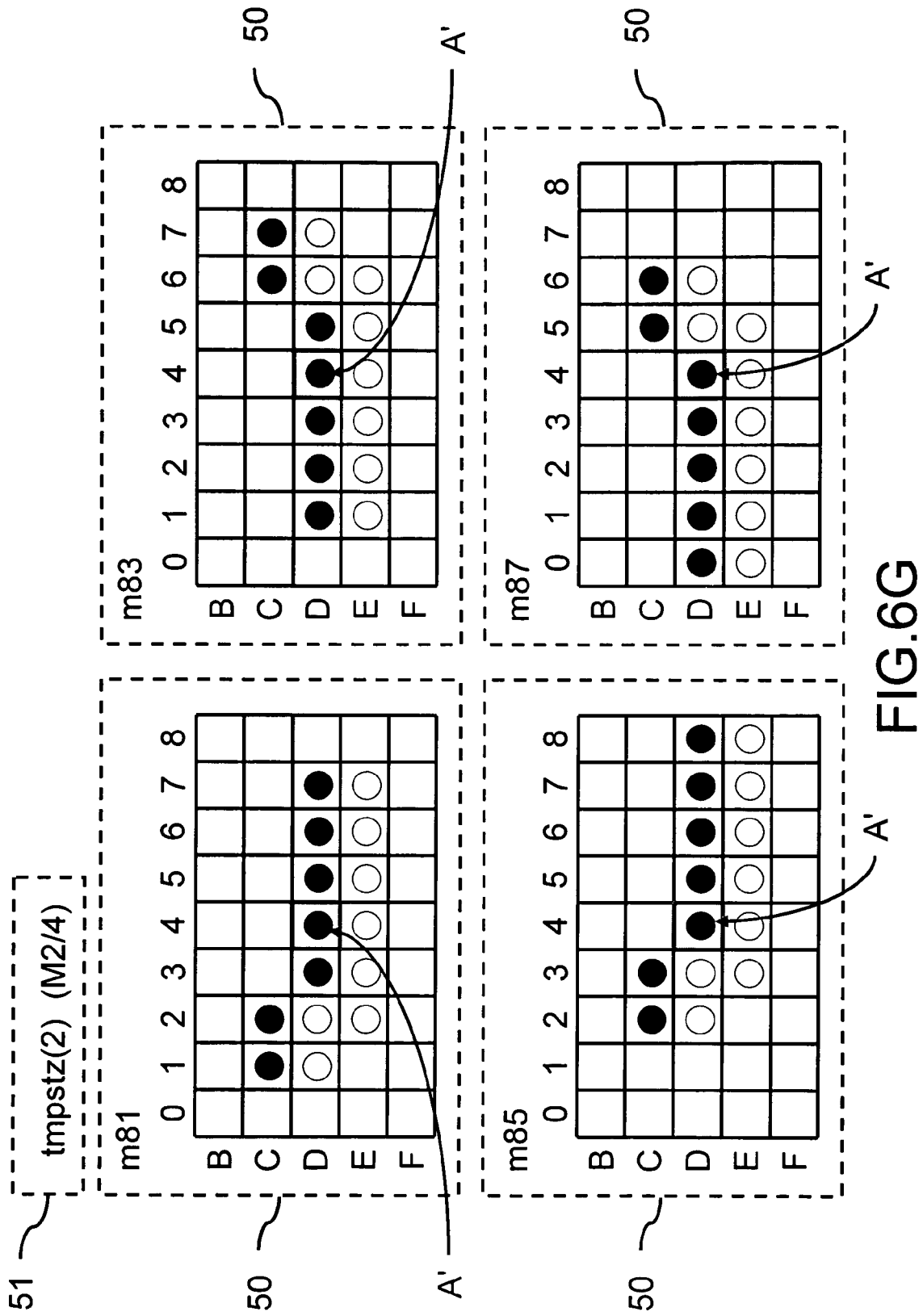
Figure 6H:
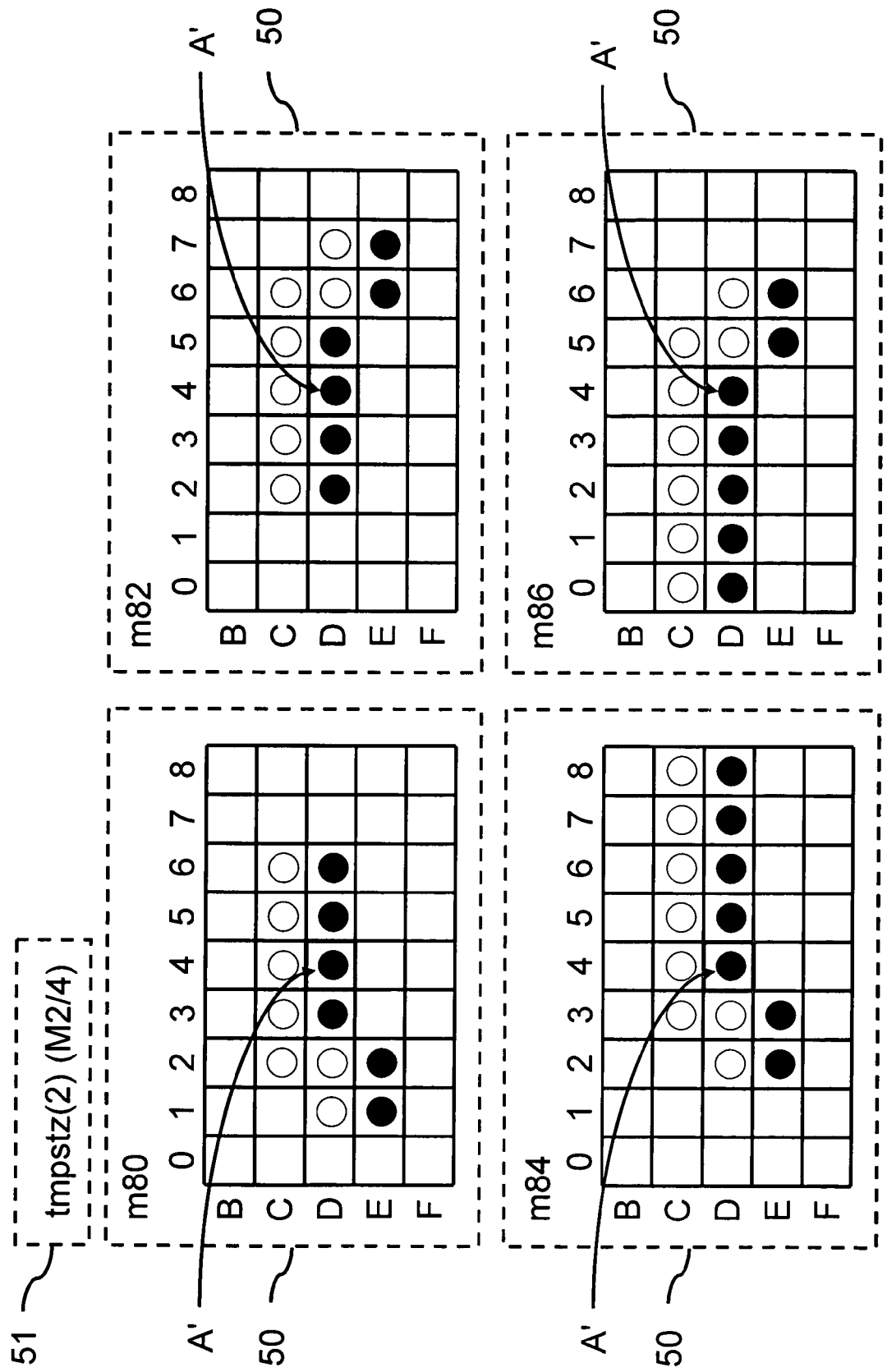
Figure 6I:
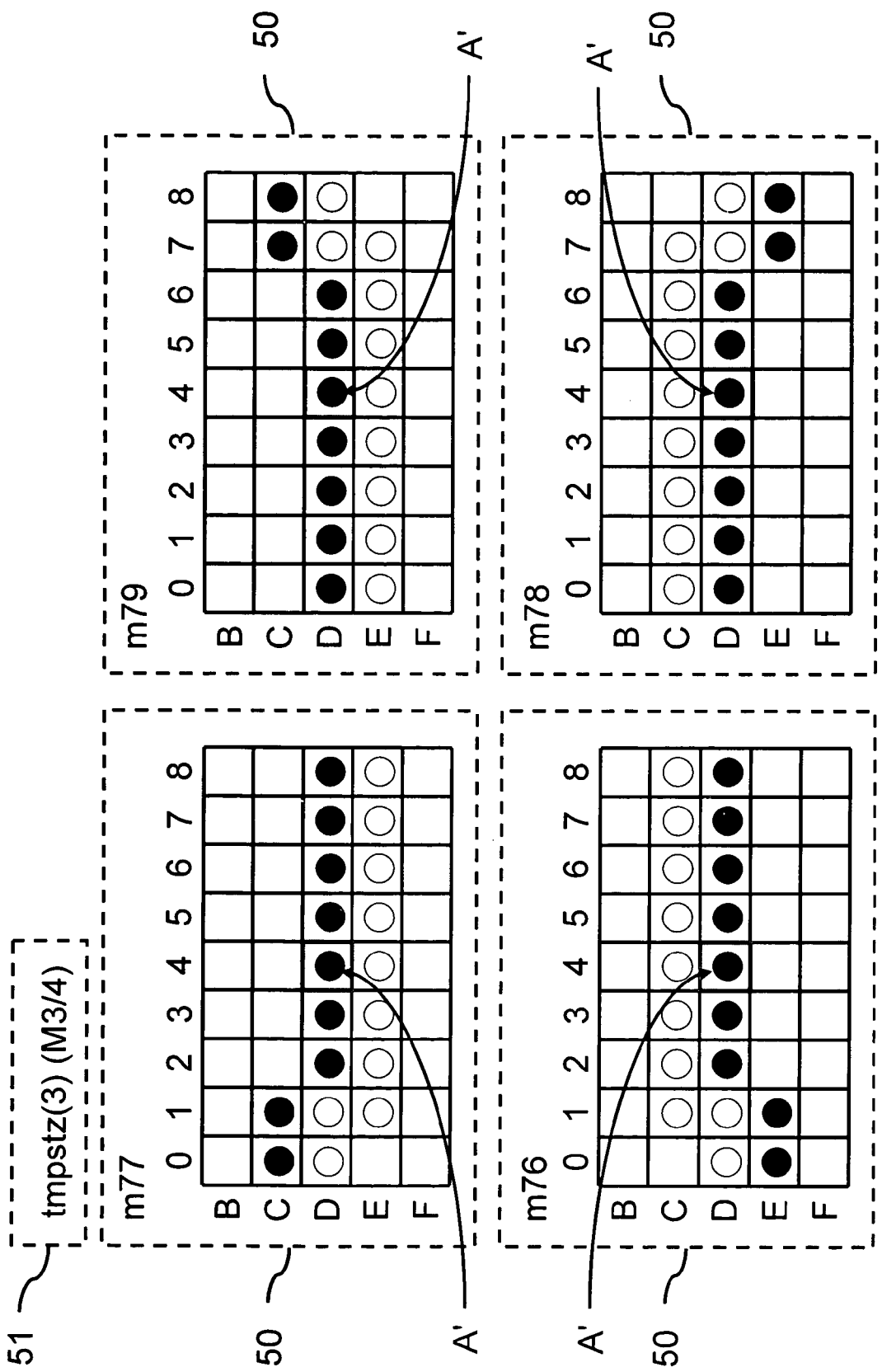

In this step, the dotting pattern of the edge pixel A and the pixels in its perimeter, as shown in FIG. 5, is compared with the patterns in FIGS. 6A to 6I of the edge enhancement table, to search and find that the pattern in number m44 dotting table 80 of the PP2 group, as shown in FIG. 6A, match the dotting pattern of central pixel A' and the pixels in its perimeter, as shown in FIG. 5. Thus, the dotting command 81 corresponding the m44 dotting table 80 indicates that the enhanced dotting of the edge pixel is performed at the left ⅓ position of the central pixel A', so that its edge can be smoother.

Subsequently, divide the overlapped halftone image as shown in FIG. 5 into the images of four color planes, having four different colors: Cyan, Magenta, Yellow, and Black (CMYK) respectively as shown in FIGS. 7A to 7D (step 50).

Then, compare the dotting patterns of the edge pixel to be enhanced and the pixels in its perimeter in the respective color planes with the dotting table obtained in step 40, thus determine the color plane having the most matching pattern (step 60).

Figure 8A:
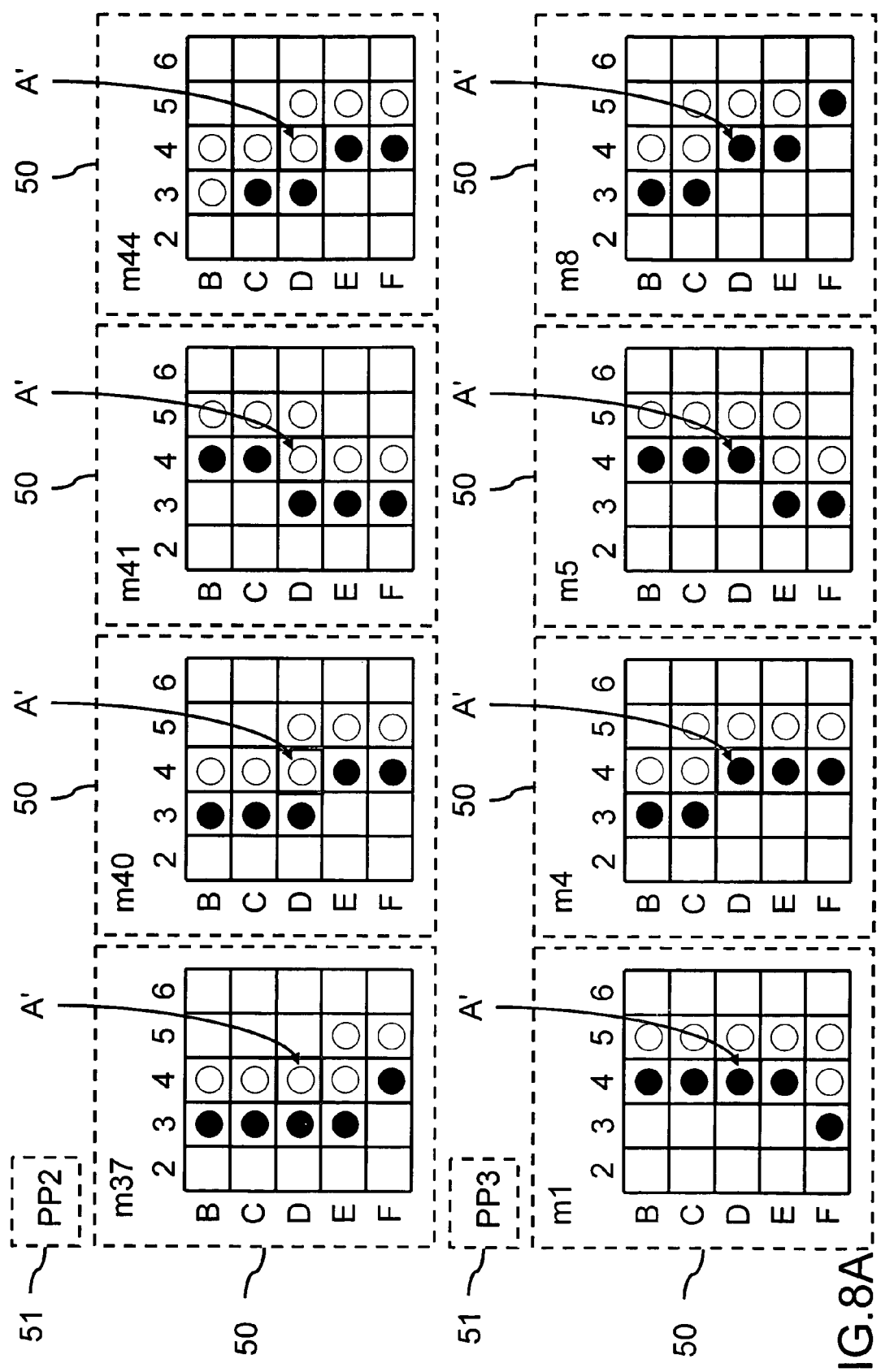
FIGS. 8A to 8E show the dotting tables obtained by deleting the columns 0,1,7,8 of each of the respective dotting tables in the edge enhancement tables contained in FIGS. 6A to 6I respectively.
Figure 8B:
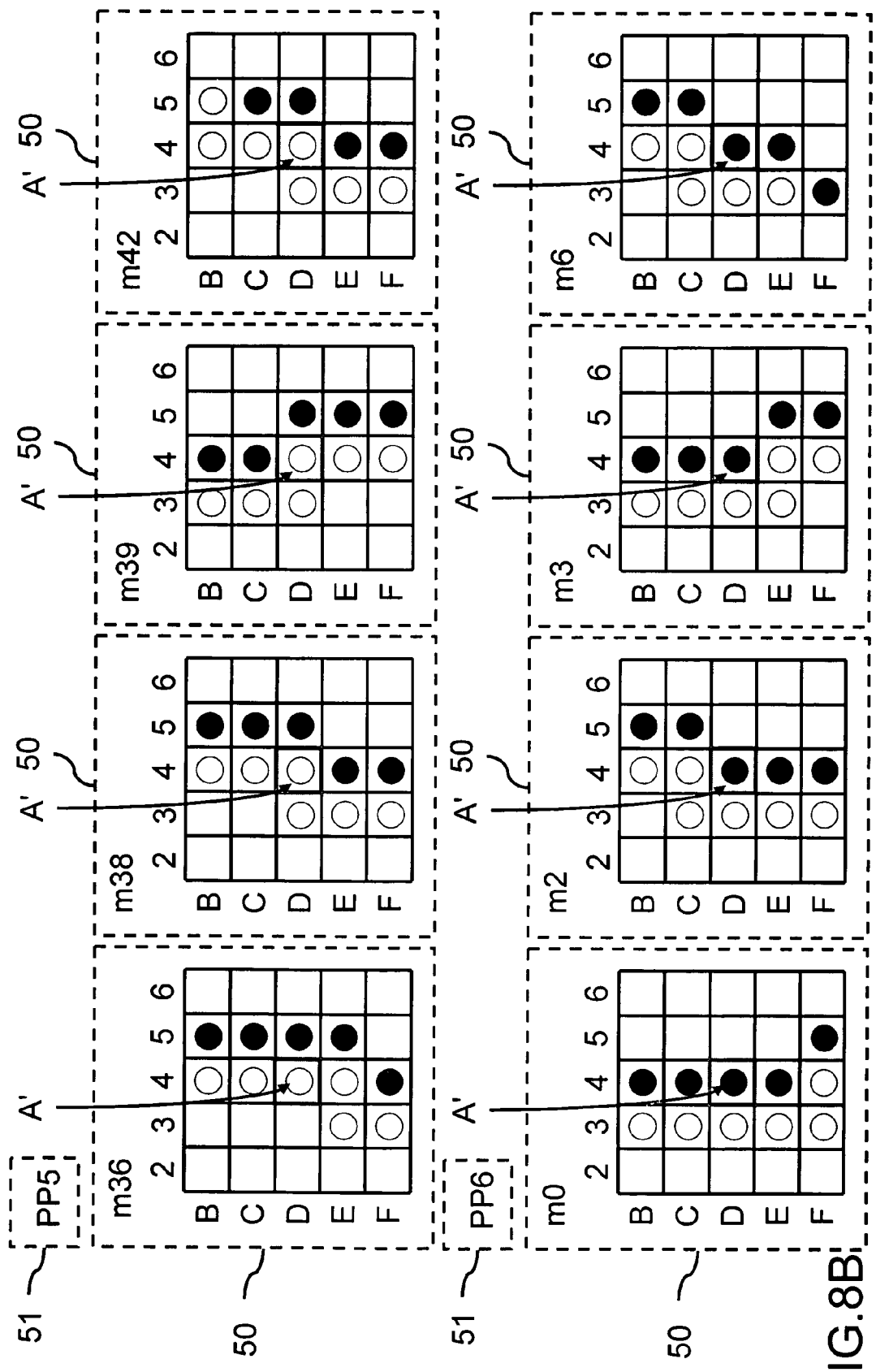
Figure 8C:
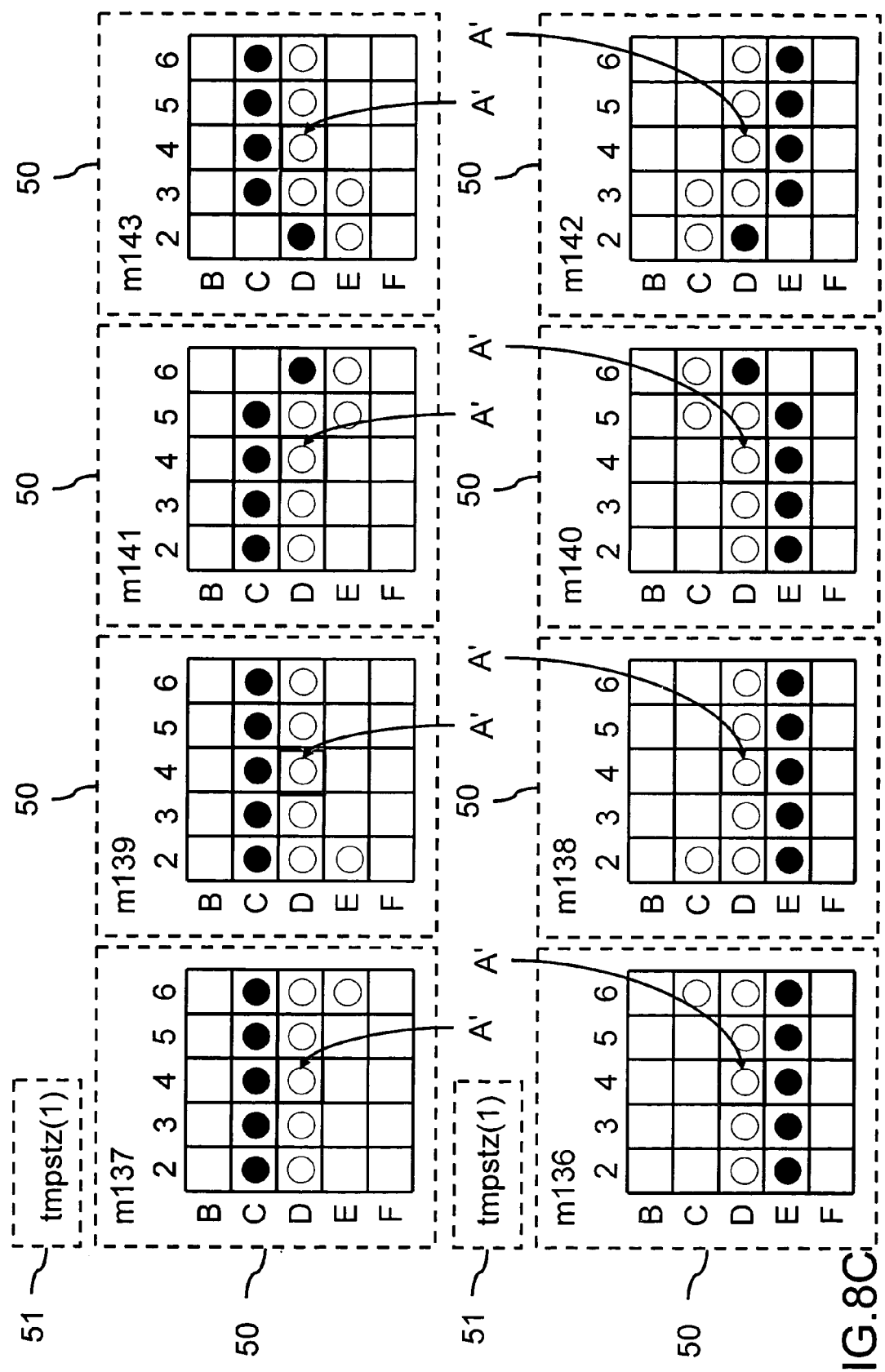
Figure 8D:
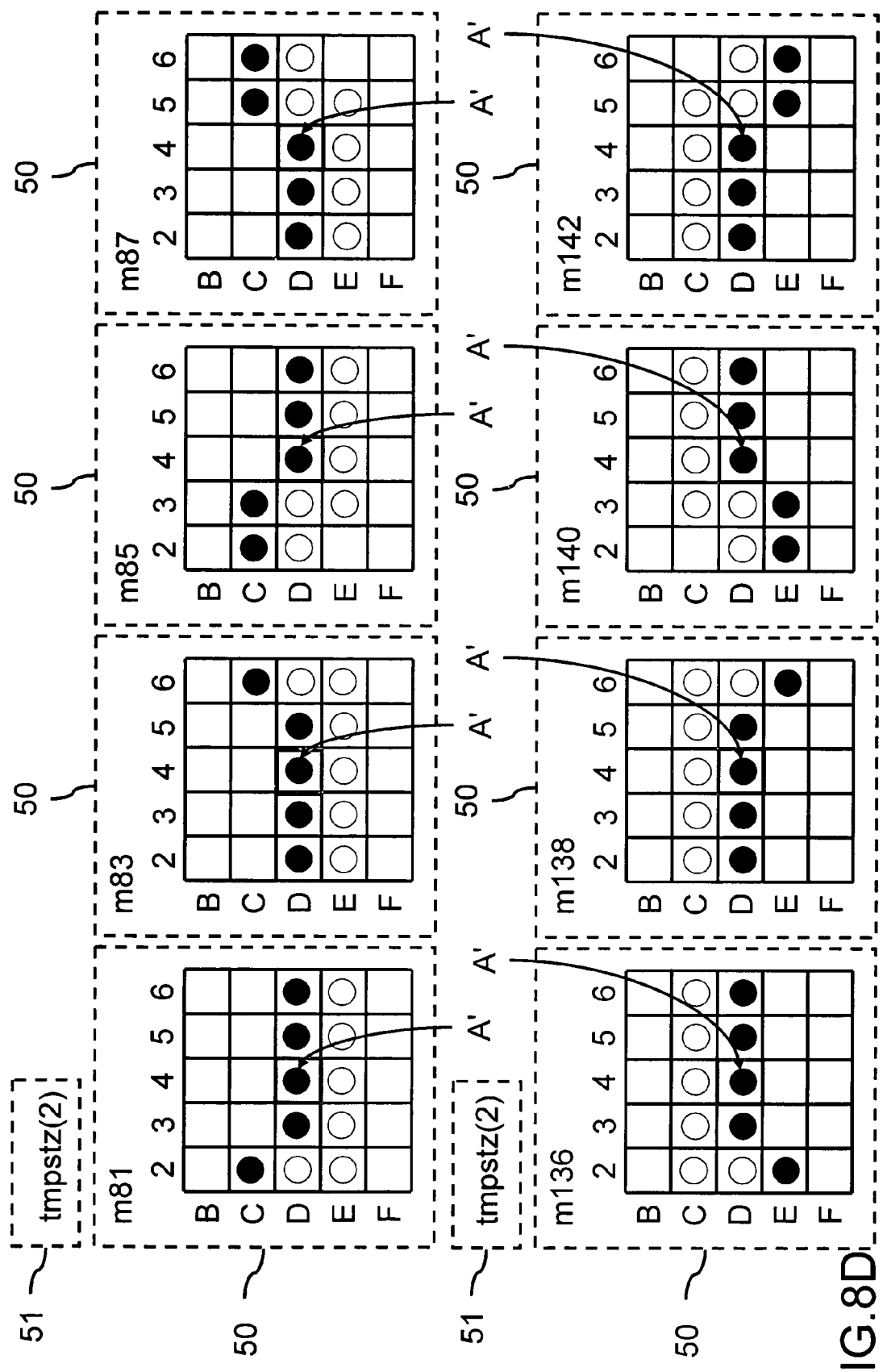
Figure 8E:
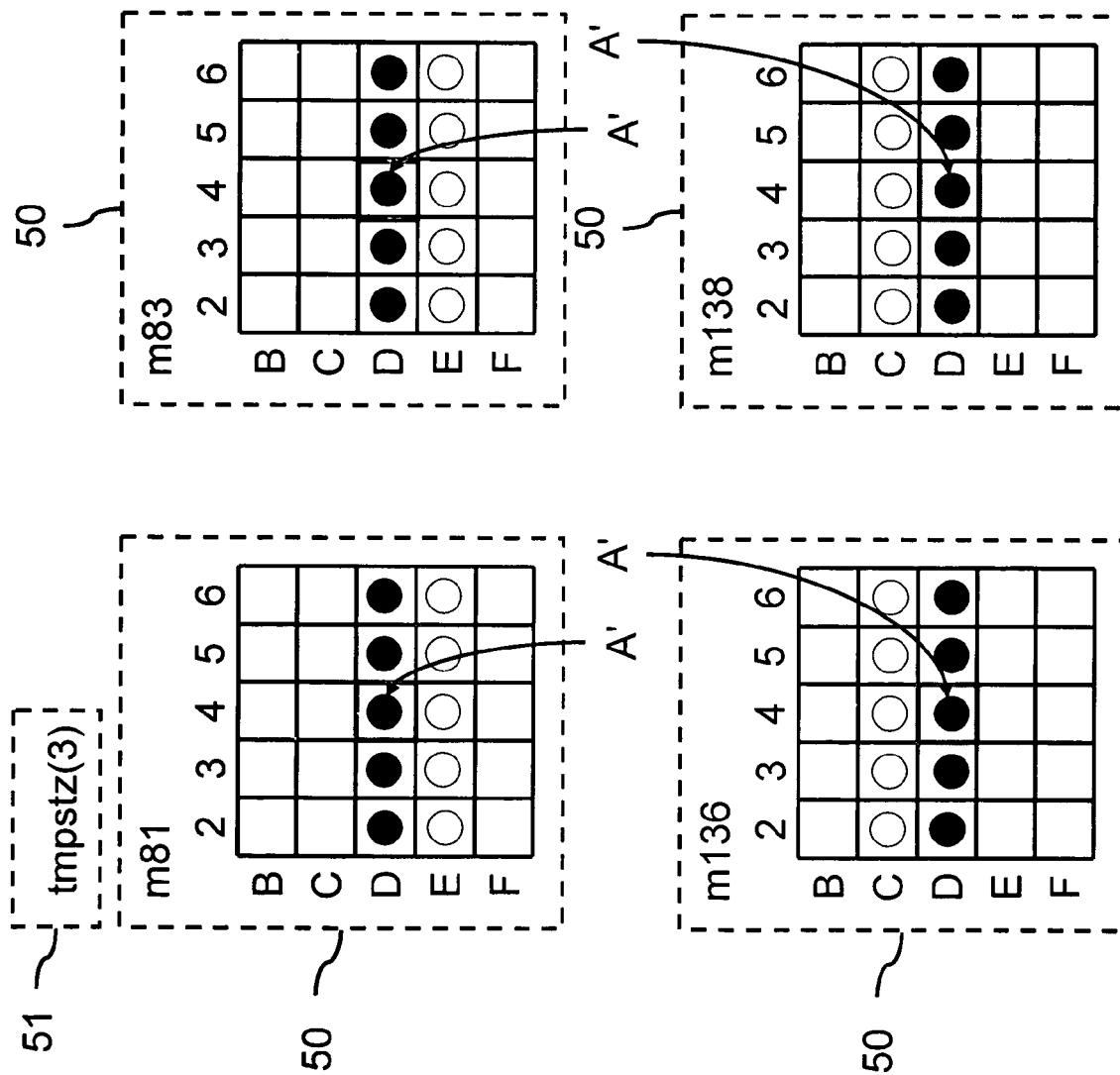

Thus, by comparing the image patterns of the respective color planes as shown in FIGS. 7A to 7D, with the pattern of number m44 dotting table 80 in FIG. 8A as obtained in step 40, it is evident that the image pattern in the Cyan color plane matches the pattern of number m44 dotting table 80 most. The image pattern in the Magenta color plane one grid differs from that of the pattern of number m44 dotting table 80, and the image patterns in the Yellow and Black color planes are entirely different from the pattern of number m44 dotting table 80 respectively.

Finally, implement the enhanced dotting of the edge pixel (step 70) with the dotting command obtained in step 40 by making use of the color plane having the most matching pattern as determined in step 60. As such, the enhanced dotting of the edge pixel A as shown in FIG. 1 is achieved by dotting at the central pixel A left ⅓ position, through utilizing the Cyan color plane, thus the edge of the image produced is smoother without generating jagged edges.

In addition, in the above step 40, the columns 0, 1, 7, and 8 of each of the respective dotting tables 80, as shown in FIGS. 6A to 6I, may be deleted, so that each dotting table 80 is reduced to a 5 by 5 grid table, as shown in FIGS. 8A to 8E, without significantly affecting the results of the enhanced dotting of the central pixel A'.

As such, in the comparison of step 60, the 5 by 5 dotting table 80 may be utilized to compare the patterns of the color planes and that of the dotting table, thus determine the color plane having the most matching pattern in a similar manner.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color image edge enhancement method, comprising:
   implementing a halftone processing of a color image to produce a halftone image;
   comparing a dotting pattern of an edge pixel to be enhanced and the pixels in its perimeter in the halftone image with contents of an edge enhancement table, to search and obtain a dotting table and a corresponding dotting command having the most matching pattern;

dividing the halftone image into images of four color planes of cyan, magenta, yellow, and black (CMYK) colors respectively;

comparing the dotting pattern of the edge pixel to be enhanced and the pixels in its perimeter in the respective color planes with the pattern in the dotting table to determine the color plane having the most matching pattern; and executing the enhanced dotting of the edge pixel with the dotting command by making use of the color plane having the most matching pattern.

2. The color image edge enhancement method as claimed in claim 1, wherein the step of performing the halftone processing of a color image to produce a halftone image further comprising the following steps:

dividing a color image into images of four color planes of CMYK colors respectively;

executing the halftone processing of the respective color planes; and overlapping the images of the respective color planes to produce an overlapped halftone image.

3. The color image edge enhancement method as claimed in claim 1, wherein the edge enhancement table is provided with more than one dotting tables, the respective dotting tables corresponding the various different dotting commands according to the patterns of its central pixel and the pixels in its perimeter.

4. The color image edge enhancement method as claimed in claim 1, wherein the dotting command indicates the dotting positions of the edge pixel to be enhanced.

5. The color image edge enhancement method as claimed in claim 1, wherein the dotting table is a 9 by 5 grid table.

6. The color image edge enhancement method as claimed in claim 5, wherein the dotting table used in the step of comparing the pattern of the edge pixel to be enhanced and the pixels in its perimeter in the respective color planes with the pattern in the dotting table to determine the color plane having the most matching pattern is by utilizing a 5 by 5 grid table of the central portion of the dotting table to perform the comparison of the patterns.

* * * * *